Jan. 10, 1939.  C. W. SINCLAIR  2,143,457

WHEEL CONSTRUCTION

Filed Dec. 16, 1935

INVENTOR
CHARLES W. SINCLAIR
BY
ATTORNEYS

Patented Jan. 10, 1939

2,143,457

UNITED STATES PATENT OFFICE 2,143,457

WHEEL CONSTRUCTION

Charles W. Sinclair, Detroit, Mich., assignor to Kelsey-Hayes Wheel Company, Detroit, Mich., a corporation of Delaware Application December 16, 1935, Serial No. 54,743

2 Claims. (Cl. 301—9)

The invention relates to wheel constructions and refers more particularly to wheel constructions for use with motor vehicles of that type having demountable wheel bodies.

The invention has for one object to provide an improved wheel construction having a hub with axially and radially spaced seats and a wheel body mounted on the hub seats with its median plane of rotation near the zone of the seats. The invention has for another object to provide a wheel construction in which the wheel body has a bolting-on flange which is axially offset from an end of the nave portion and which is mounted on the hub in a manner to relieve the part of the bolting-on flange engaged by the means for securing the wheel body to the hub of the greater part of the radial wheel load. The invention has for a further object to so mount the wheel body on the hub that the part of the bolting-on flange engaged by the securing means may flex axially and thereby assist in holding the securing means from accidental disengagement.

Figure 2:
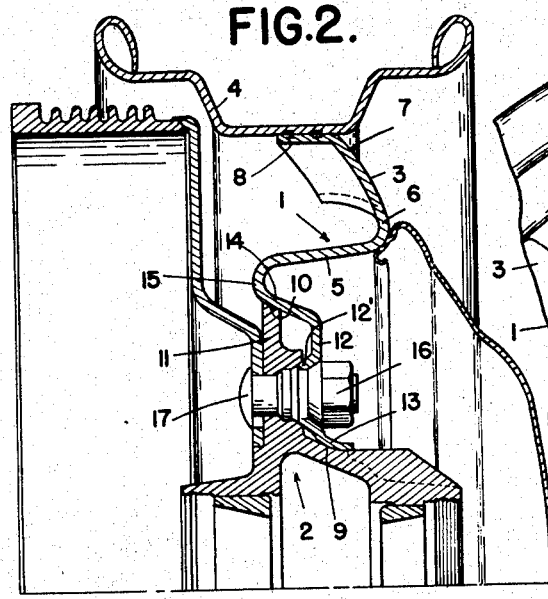
Figure 1:
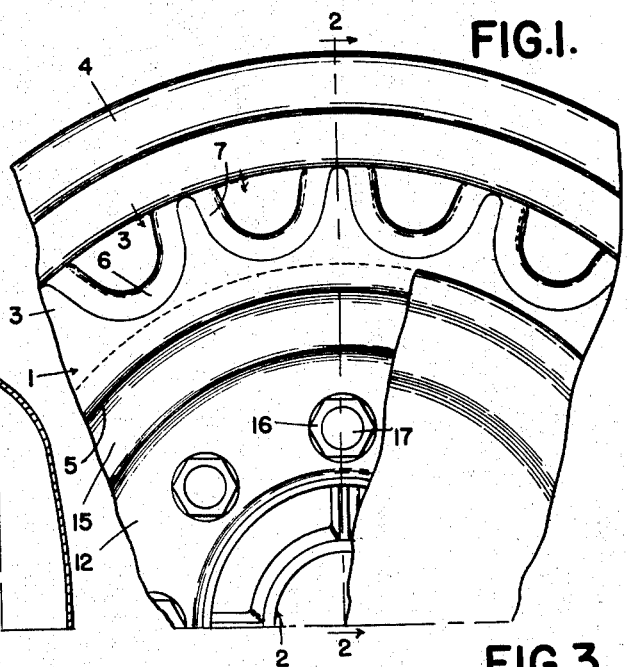
Figure 3:
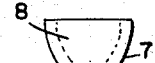
Figure 5:
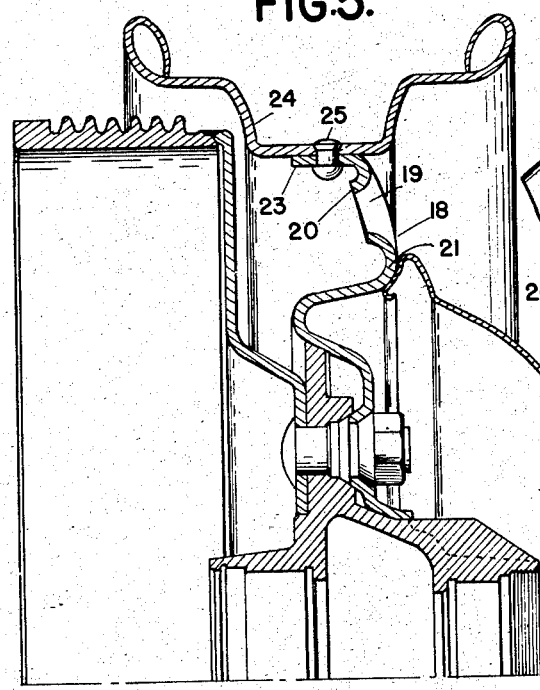
Figure 4:
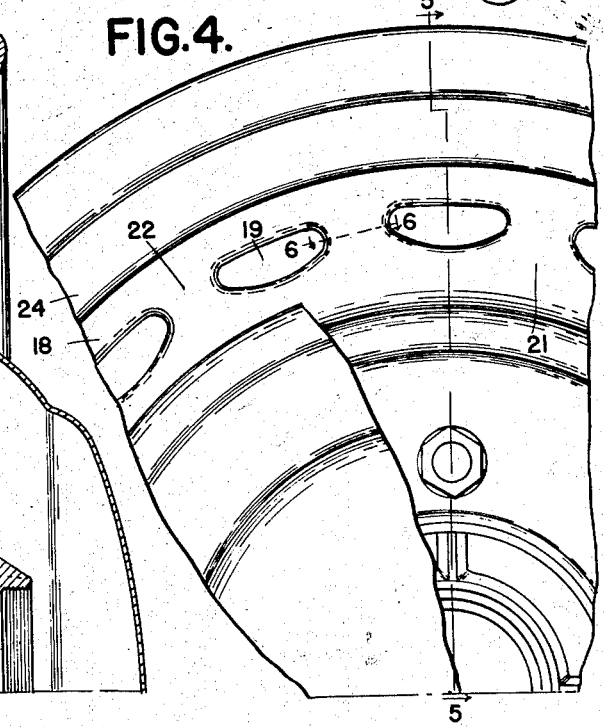
Figure 6:

These and other objects of the invention will become apparent from the following description, taken in connection with the accompanying drawing, in which Figure 1 is an elevation of a wheel construction showing an embodiment of my invention;

Figures 2 and 3 are cross sections on the lines 2—2 and 3—3, respectively, of Figure 1;

Figure 4 is an elevation of a wheel showing another embodiment of my invention;

Figures 5 and 6 are cross sections on the lines 5—5 and 6—6, respectively, of Figure 4.

Referring to the wheel construction shown in Figures 1, 2, and 3, 1 is the wheel body and 2 the hub. The wheel body is a one-piece sheet metal stamping having the radially inner bolting-on flange 2, the radially outer portion 3 for connection to the rim 4, and the intermediate generally axially extending annular portion 5 connecting the bolting-on flange and the radially outer portion. The radially outer portion 3 has the nave portion 6 and the spoke portions 7 extending radially outwardly from the nave portion, these spoke portions having a channel section and opening axially inwardly and being closed at their outer ends by the integral flanges 8 to which the rim 4 is secured by suitable means, such as welding. The annular portion 5 extends generally axially inwardly from the axially outer end of the nave portion 6, the arrangement being such that the bolting-on flange 2 is axially offset inwardly relative to the axially outer end of the nave portion and near the median plane of rotation of the wheel.

For the purpose of effectively mounting the wheel body 1 on the hub 2 and relieving the part of the bolting-on flange engaged by the securing means from the greater part of the radial wheel load, the hub 2 is provided with the radially inner and outer axially and radially spaced seats 9 and 10, respectively, and the bolting-on flange is formed to engage these seats radially inwardly and outwardly of the part engaged by the securing means. The radially inner seat 9 is preferably a beveled seat formed upon the barrel of the hub and the radially outer seat 10 is preferably a beveled seat which is formed upon the periphery of the radially fixed flange 11 of the hub, this flange being located axially inwardly of the seat 9. The bolting-on flange is formed with the flexible radially extending part 12 and with the radially inner and outer seating parts 13 and 14, respectively. These latter parts extend generally axially, but are inclined to fit their respective beveled seats. The radially inner part 13 extends generally axially outwardly and radially inwardly, while the radially outer seating part extends generally axially inwardly and radially outwardly from the part 12. The annular portion 5 connects into the radially outer seating part 14 by the return bend 15 forming part of the bolting-on flange. The parts are so arranged that the median plane of rotation of the wheel body is near the zone of the seats 9 and 10 and, as shown, passes axially therebetween. The parts are also so arranged that the radially outer seating part 14 engages its seat 10 prior to engagement of the radially inner seating part 13 with its seat 9 while mounting the wheel body upon the hub and that both seats are engaged prior to engagement of the radially extending part 12 with the fixed flange 11, so that upon further tightening of the securing means, which, as shown, comprises the nuts 16, the radially extending part is flexed axially inwardly, thereby tending to hold the wheel body upon the hub and also serving to prevent accidental disengagement of the nuts from their bolts 17. As shown, the part 12 is formed with the annular series of frusto-conical driving projections 12' for engaging corresponding recesses in the fixed flange 11.

With this construction, a strong substantial wheel is formed having great strength in both axial and radial directions. Also the part of the bolting-on flange engaged by the securing means is relieved of the greater part at least of the wheel load and is free to flex axially.

The modification illustrated in Figures 4, 5 and 6 is very similar to that illustrated in Figures 1, 2 and 3 and has the same general arrangement of parts for positioning the wheel body with its median plane near the zone of the axially and radially spaced seats of the hub, for transmitting wheel load from the wheel body directly to the hub radially outwardly beyond the part of the bolting-on flange of the wheel body used in securing the wheel body to the hub and for securing flexibility of this part of the bolting-on flange while securing the wheel body to the hub. In this modification, however, the radially outer portion 18 of the wheel body is formed with the angularly spaced openings 19 which are bordered by the generally axially inwardly extending flanges 20, the radially innermost of which serve to form the nave portion 21. With this construction, the parts between the openings in effect are spoke portions 22 of channel section opening axially inwardly. The wheel body terminates at its outer periphery in the axially inwardly extending flange 23 to which the rim 24 is secured by suitable means, such as the rivets 25.

What I claim as my invention is:

1. In a wheel and hub assembly, a sheet metal wheel body having a radially inner bolting-on flange provided with bolt openings therethrough and having a radially outer portion for connection to a rim, said bolting-on flange having a flexible radially extending part, an annular portion extending axially rearwardly from the bolting-on flange and terminating at the rear edge in an axially forwardly projecting annular portion extending beyond the plane of the bolting-on flange and connected to the radially outer portion, a hub provided with a radial flange having an annular seat engageable with the axially rearwardly extending portion adjacent the rear end of the latter, and means located within the confines of the axially forwardly extending portion for demountably securing the flexible radially extending part of the bolting-on flange to the radial flange of the hub.

2. In a wheel and hub assembly, a sheet metal wheel body having a radially inner bolting-on flange provided with bolt openings therethrough and having an axially forwardly extending flange at the radially inner edge of the bolting-on flange, said wheel body also having an annular portion extending axially rearwardly from the bolting-on flange and terminating at the rear edge in an axially forwardly projecting annular portion extending beyond the bolting-on flange and terminating in a radially outwardly extending portion terminating in an axially rearwardly extending rim engaging flange, a hub provided with a radial flange having an annular seat engageable with the axially rearwardly extending portion adjacent the rear end of the latter and having an annular seat spaced axially forwardly from the annular seat aforesaid for engagement with the axially forwardly extending flange at the inner edge of the bolting-on flange, and a rim secured to said axially rearwardly extending rim engaging flange at points located within a zone defined by radial planes passing through said annular seats.

CHARLES W. SINCLAIR.